R. C. PENFIELD.
APPARATUS FOR UNLOADING ARTICLES IN STACKED FORMATION.
APPLICATION FILED MAY 21, 1919.
1,371,392.
Patented Mar. 15, 1921.
4 SHEETS—SHEET 2.
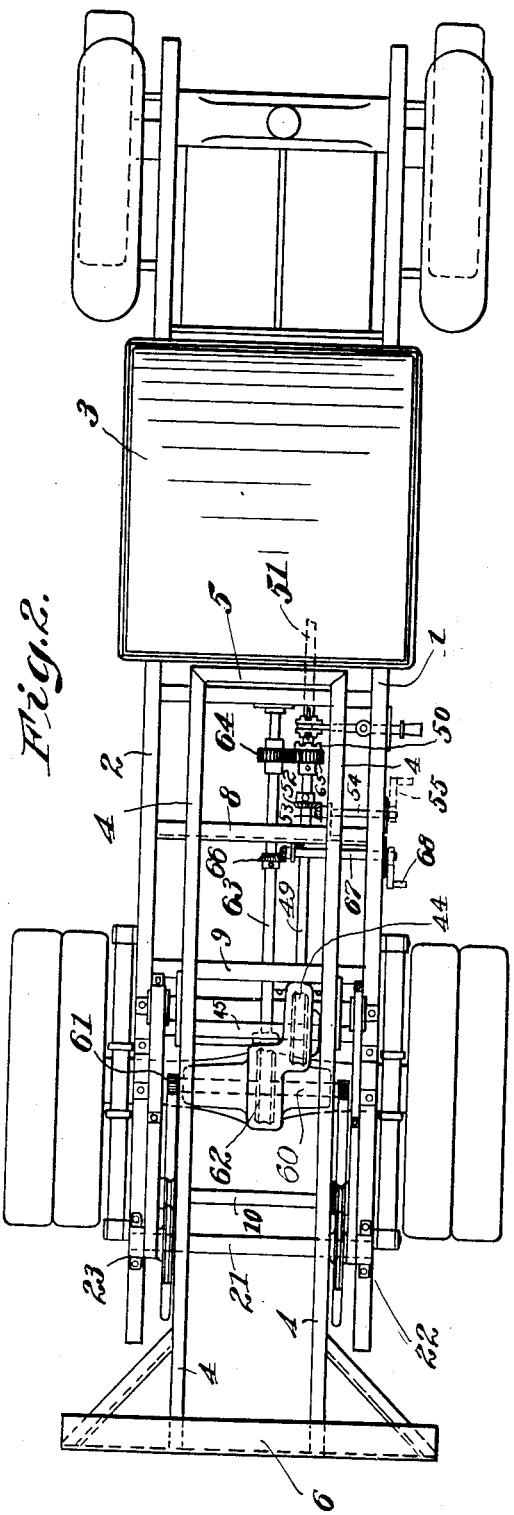
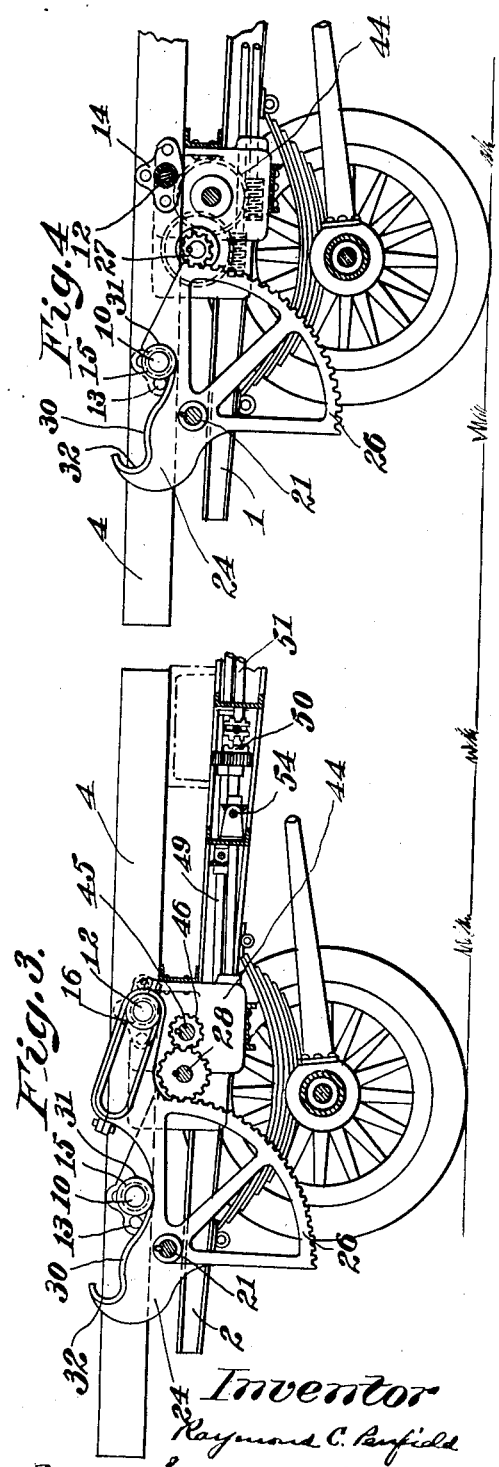
Inventor
Raymond C. Penfield
James R. Hodder
by Attorney

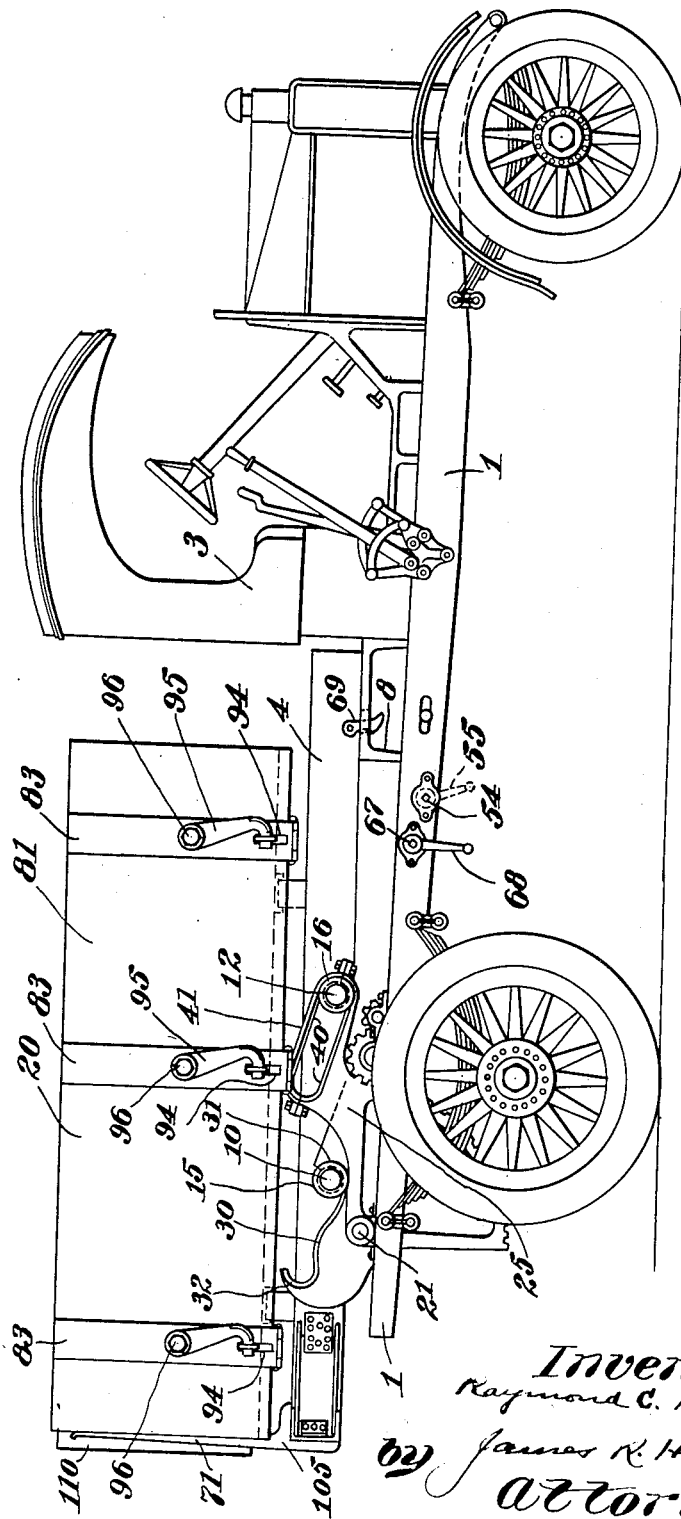

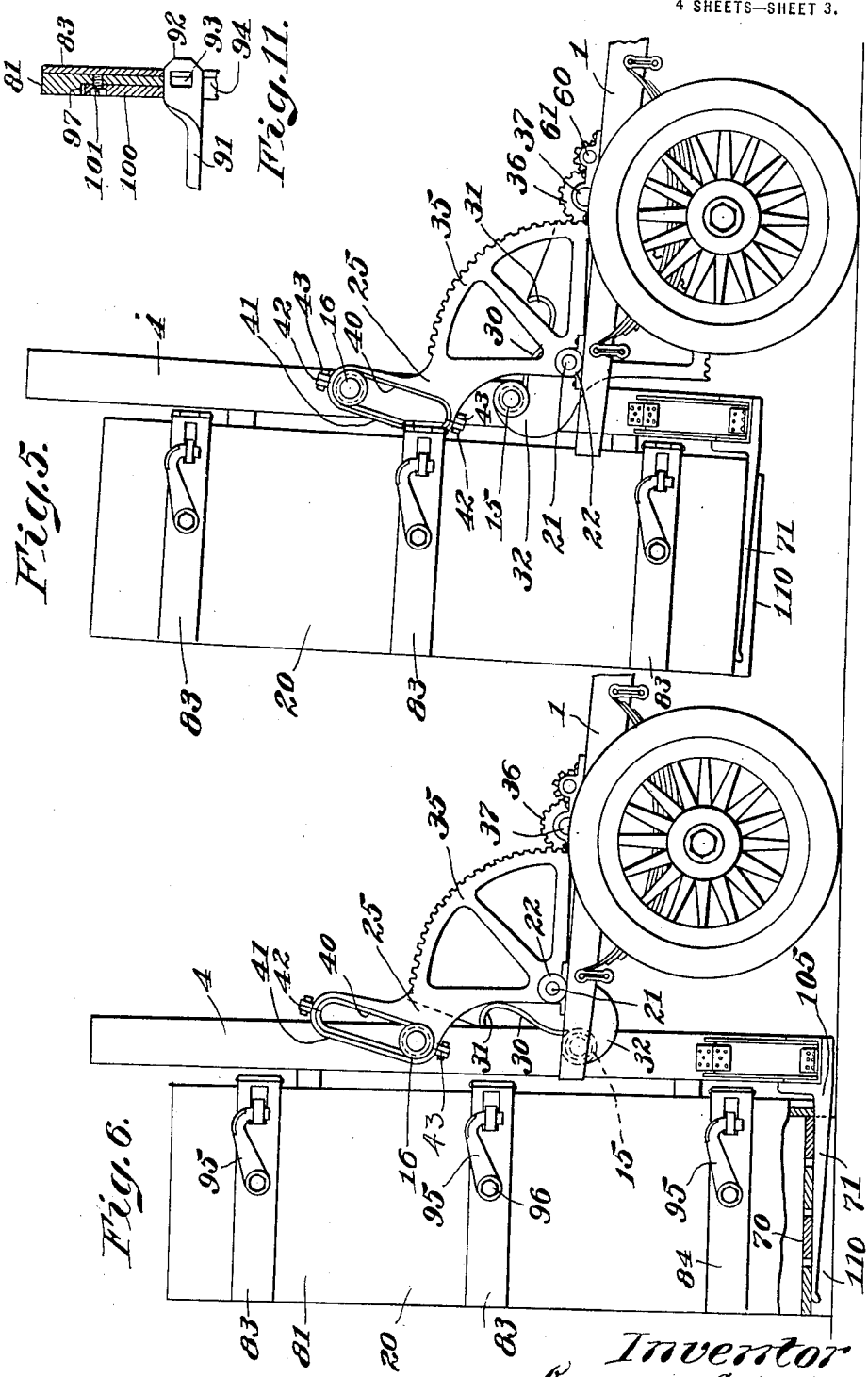

R. C. PENFIELD.
APPARATUS FOR UNLOADING ARTICLES IN STACKED FORMATION.
APPLICATION FILED MAY 21, 1919.
1,371,392.
Patented Mar. 15, 1921.
4 SHEETS—SHEET 4.
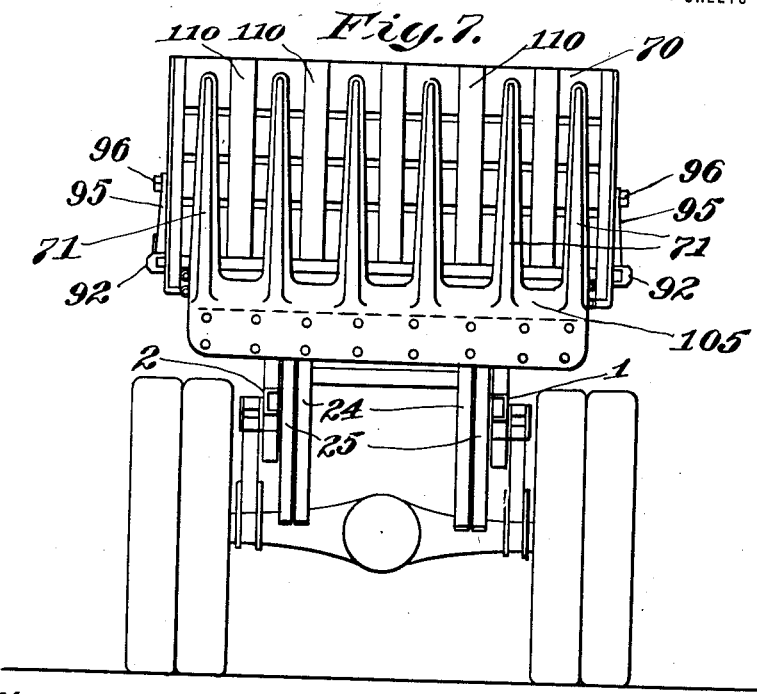
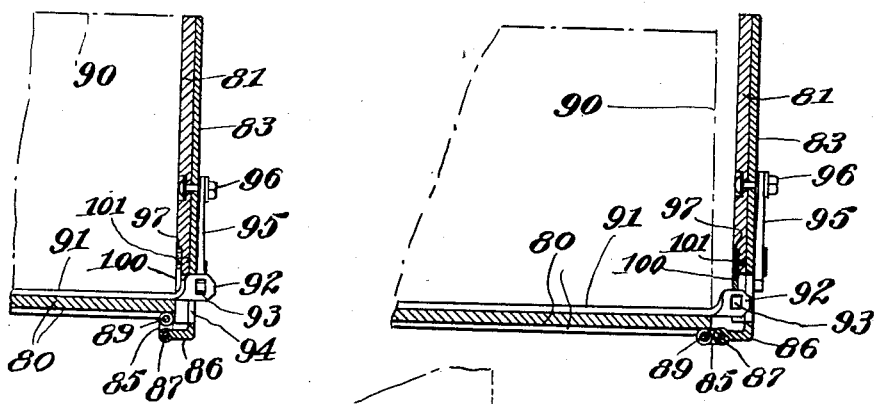
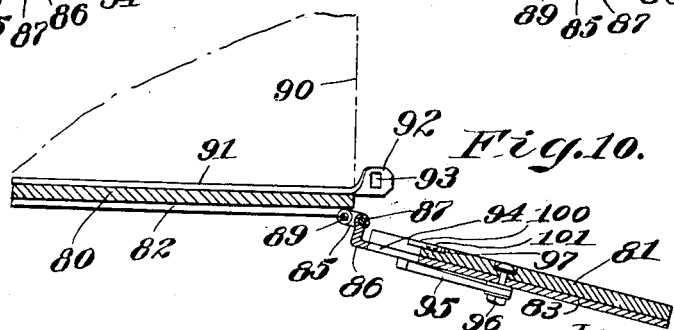
Inventor
Raymond C. Penfield
by James K. Hodder
Attorney

UNITED STATES PATENT OFFICE.

RAYMOND C. PENFIELD, OF NEW YORK, N. Y.

APPARATUS FOR UNLOADING ARTICLES IN STACKED FORMATION.

1,371,392.  Specification of Letters Patent. Patented Mar. 15, 1921.

Application filed May 21, 1919. Serial No. 298,697.

*To all whom it may concern:*

Be it known that I, RAYMOND C. PENFIELD, a citizen of the United States, and a resident of New York city, (whose post office address is No. 336 Riverside Drive, New York,) New York, have invented an Improvement in Apparatus for Unloading Articles in Stacked Formation, of which the following description, in connection with the accompanying drawings, is a specification, like letters on the drawings representing like parts.

The present invention relates to apparatus for loading, transporting, and unloading articles such as brick, blocks, paving stones, or the like into stacked formation and more particularly to the unloading of the stack in substantially unit form and into the position and formation desired.

It is an important object of the invention to provide a transporting device capable of receiving a load of articles—such as brick—in predetermined formation, carrying and transporting them in said formation and unloading the brick in any desired position without injury to the same and while holding them in the original piled formation. As herein illustrated, an automobile truck is utilized as the carrying and handling means and a movable vehicle body is mounted thereon in a novel and efficient manner. Means are provided for the handling of the movable body so as to position and lower it adjacent to the ground without danger of disalining the stacked formation of the articles carried therein. The importance of this method of handling stacked units by a truck or vehicle without damage or danger to the brick, will be appreciated when it is realized that heretofore it has been customary to pile or dump brick into a wagon, transport the same to the unloading position and then simply tilt or upset the wagon body and allow the brick to slide off. It has also been attempted to unload brick by making an entirely detachable brick carrying body which was dumped while holding the brick and left with its load, but this method was very objectionable, requiring many bodies,—difficulty in unloading the brick from the body, handling such an article and was necessarily limited to a small sized body capable of being lifted around by manual force. In the present invention I have obviated the difficulties above briefly outlined and have devised a vehicle, capable of carrying and handling a large number or unit of brick, 2500 or more, supporting the brick carrying body onto the chassis—which body is capable of being moved into a vertical position and gradually lowered until its rearmost end is in contact with the ground, both for loading and unloading, having the vehicle body—either when loaded or light—under perfect and constant control and in substantially balanced relationship to the mechanism operating it. Further important features consist in the provision of means for automatically positioning alining or "spotting" the load when unloading with provision for unloading an entire unit stack closely adjacent and in contact with a wall, previously piled unit stack, or the like.

A further feature of the present invention is particularly adapted for use in any vehicle handling brick or other articles which are piled closely therein for transportation,—and consists in means to have the sides capable of being slightly spaced from the load to facilitate unloading. In carrying out this provision, I prefer to have the sides of the vehicle body so mounted as to permit them to be tightly in contact with the brick during transportation, to hold the same and in unit formation—presenting shifting, jarring, and damaging of the brick and then to swing the sides slightly therefrom, spacing the same substantially an equal extent throughout the entire height and breadth of the side. I accomplish this by suitable links or other provision as will be explained.

Referring to the drawings illustrating a prefererd embodiment of the invention—

Figure 1 is a side view of an automobile truck embodying a movable vehicle body of the present invention;

Fig. 2 is a plan view of the mechanism on the chassis with the top of the body removed;

Fig. 3 is a side view on a portion of the quadrant and one of the quadrants and dumping devices;

Fig. 4 is a fragmentary side view of the coöperating dumping quadrant and device;

Fig. 5 is a view showing the vehicle body in vertical position ready to be lowered;

Fig. 6 illustrates the body in final position either for picking up a load or for unloading;

Fig. 7 is an end view of the vehicle truck;

Fig. 8 is a fragmentary side view partly in cross section showing the spacing sides;

Fig. 9 is a view similar to Fig. 8 showing the sides;

Fig. 10 is a further view in cross section showing the sides swung outwardly a suitable distance for alining the vehicle with relation to a wall, other unit, or the like, preliminary to spotting the load for unloading; or illustrates the side clear down for loading the body by hand.

Fig. 11 is a detail showing the mechanism for attaching the sides to the bottom braces.

While I have herein illustrated and shown an automobile truck with the dumping body of the present invention, designed and constructed particularly for handling a large load or unit of brick, it will be appreciated that other articles can be handled with equal facility wherein it is important that they be unloaded in a predetermined manner. I contemplate the use of an automobile truck of this kind in coöperation with unit brick setting devices and for this purpose have especially designed a vehicle capable of receiving, carrying, and unloading a unit stack of brick, which stack has been originally handled by a mechanical setter and which it is intended may be again handled by a mechanical setting apparatus. In such instances, it is especially important that the load or stack be unloaded and left in its unit formation substantially undisturbed and ready to be again picked up for further handling.

As shown in Fig. 1, an automobile chassis of standard type for this purpose is illustrated in conventional form, wherein the chassis frame 1 and 2 is of appropriate strength and length to carry the load intended. Immediately back of the driver's seat 3 is built the frame carrying the movable body. This frame consists in side members 4 and 4, a forward cross member 5 rearward member and brace 6, and such intermediate cross frames as may be necessary. This frame would normally rest upon the crossbars 8 and 9, of the chassis frame, the forward brace 8 being preferably in the form of a channel iron, as shown in Fig. 1. This frame has a pair of shafts or axles 10 and 12 extending through the frame in suitable bearings 13 14 respectively in each frame and carrying flanged rollers 15 and 16 respectively on each end of said shafts. These rollers 15 and 16 are handling means by which the movable frame carrying the vehicle body, the latter being designated generally at 20, is moved upwardly to an inclined position from off the cross braces on the chassis held in vertical position by the quadrants and lowered downwardly into unloading position with the rearmost end of the body 20 in contact with the ground, and also are the handling means by which the entire body is withdrawn from the load when the automobile truck is started forward. Conversely, the truck may be backed into loaded position to pick up a load. These pairs of rollers 15 and 16 and their respective shafts are so located on the frame and body as to be properly spaced to give suitable leverage for the handling of the body either in inclined or vertical position. Preferably these rollers are relatively close together so that the entire body may be handled substantially from a central position, the quadrants to be described, engaging these rollers—being furthermore pivotally secured at a point normally at the rear of the rollers but when the vehicle body is in vertical position with its end in contact with the ground, then the said pivot point is between the rollers so that during the forward or backward movement of the automobile truck, a substantially balanced strain or pull will be transmitted through both rollers on each side of the body. This pivot consists of a strong shaft 21 secured to the chassis frame 1 and 2 in appropriate brackets 22 and 23 respectively.

Mounted to this pivot 21 are a pair of quadrants at each side of the vehicle body, one quadrant 24 being pivoted on the shaft 21 immediately inside and adjacent to each chassis frame 1 and 2 and the adjacent quadrant 25 being pivoted on said shaft closely adjacent thereto. Each quadrant 24 has a toothed segment 26 adapted to mesh with a pinion 27 mounted on a shaft 28 to oscillate said segment about the pivot 21. Opposite to the segment 26 is a cam track 30 on which the adjacent flanged roller 15 carried by the vehicle body is adapted to travel. This cam track 30 ends in the forwardly curved face 31 and a rearwardly curved hookline portion 32.

Closely adjacent each quadrant 24 is the coöperating quadrant 25 also mounted on the shaft 21, as above explained, and having a toothed segment 35 adapted to mesh with a gear 36 on a shaft 37. This segment carries a closed cam track 40 to encircle the flange roller 16. I prefer to form this cam track 40 in two sections, the lower portion being integral with the quadrant 25 and the upper portion 41 being removable therefrom, pairs of lugs 42, 42 and 43, 43 being united by bolts to hold the same in assembled position firmly engaging the rollers 16 at each side of the movable frame.

To supply power to the shafts 28 and 37 actuating the respective segments of the quadrants 24 and 25, I provide means for rotating said shafts preferably through worm gears either by power or by hand. To actuate the shaft 28, a worm and gear inclosed in a gear box 44, are provided—a gear therein turns the shaft 45 on which are gears 46 at each end in position to mesh with the gears 28, and the worm in the gear box 44 being rotated by the shaft 49, extending forwardly in suitable bearings under the chassis to a clutch 50 from which power is received from the motor of the truck through the transmission shaft 51. Secured also to the shaft 49 is a beveled gear 52 in mesh with a corresponding beveled gear 53 carried by the shaft 54 extending outwardly beyond the chassis frame 1 to receive a crank 55 so that the mechanism may be turned by hand.

To actuate the quadrant 25, a similar construction is employed, through a shaft 60 and pair of pinions 61, gear box 62, worm shaft 63 and sliding gear 64 adapted to mesh with a corresponding gear 65 on the first mentioned power shaft 49. Secured also to the shaft 63 is a beveled gear 66 coöperating with a beveled gear on the shaft 67, which latter extends outside the chassis frame 1 to receive a crank 68 for hand manipulation.

The operation of the dumping body thus far described, will be readily understood. The vehicle truck being backed into approximate position either for picking up a load or for setting down or unloading a unit stack, a catch 69 holding the forward portion of the movable frame to the chassis, is released. Power is then applied to the worm gear actuating the quadrant 25 to raise the same, this raising action exerting its tension on the forward pair of rolls 12 carried by the movable frame swinging the brackets 25 on the pivot 21. During this upward movement of the frame, the entire vehicle body and frame as well as the brackets are swung relatively about the pivot 21 and the vehicle body 20 and frame 4 travel rearwardly on the cam track 30 moving on the rolls 15. When the roller 15 has reached the rearmost end or hookline portion 32 of the inner bracket 24, the vehicle body 20 and frame will have reached the vertical position illustrated at Fig. 5, with the rollers 16 still at the forward or, now upward, position of the inclosed track 40 on the bracket 25. This inclined movement of the vehicle body and simultaneously rearward movement will have been gradually and easily accomplished, the entire load being substantially balanced on the rollers 15 and pivot 21. Also this actuation raises the vehicle body considerably, from the horizontal position with the frame 1 at rest on the chassis. This slight raising is desirable in order to enable a relatively long body 20 and consequently a large load to be handled and yet to be swung into vertical position before the rearmost or bottom portion of the vehicle body touches or strikes the ground. Referring to Fig. 5, it will be seen that the vehicle body is in vertical position with the lowermost end a suitable and considerable space from the ground. As it is desirable and advisable with a loaded truck carrying a weight of 2500 brick, to have a comparatively low center of gravity during transportation of the brick and therefore to have the vehicle body centered as low as practicable upon the chassis,—it will be appreciated that this feature of raising the body on the rearmost rollers 15 during the inclined action, is of great importance. With the vehicle body in vertical position as shown in Fig. 5, the quadrant 25 is held and locked by the worm actuating it without further movement. Thereupon power is supplied to the shaft 49 to actuate the quadrant 24, moving this quadrant on the pivot 21 and, since the rollers 15 are at the rearmost end of the cam track 30, thereby lowering the entire vehicle body while maintained in vertical position, downwardly to contact with the ground or until a support is reached, as illustrated in Fig. 6. During this vertical movement, the forward rollers 16 traverse the length of the encircling track 40. It will be seen that I have purposely formed the track 40 with a slight beveled or inclined face, so that with the vehicle body substantially vertical, as in Fig. 5, it will be held inclined somewhat toward the chassis, thus preventing any danger of the contents falling outwardly and during the vertical lowering, the inclined track 40 acts to straighten the frame and movable body into a true vertical position, so that the load when thus in unloaded position will be in correct alinement to stand where placed.

If the apparatus is to be used for loading or picking up a unit stack, the automobile when in position, as shown in Fig. 6, may be backed up to the load. In the handling of brick the unit stack may be piled on a pallet which can be engaged by the pallet 70 which would be engaged by a plurality of brackets 71 (see Fig. 7—to be further described—) and thereupon the entire load and pallet are picked up by proper rotation of the power shafts to move the segments 24 backwardly into the original or horizontal position, thus raising the vehicle body and frame to the position shown in Fig. 5, whereupon further manipulation of the shafts to actuate the segment 25 and move it downwardly into normal position, inclines the loaded body forwardly and until the frame rests on the chassis. During this loading action, the forwardly actuating inclined tracks 30 and 40 facilitate the downward and forward movement of the loaded vehicle body, centering the load well forward of the pivot 21. During unloading with the body in position as shown in Fig. 6, the pallet 70 may be unloaded on a platform or directly onto the ground, the truck being moved forwardly to draw out the members 71 from under the pallet and the unit stack left standing in vertical position.

The construction of the vehicle body with the sides adapted to be spaced from the load to facilitate unloading and to be swung at any desired angle either for loading in the side, for contact with an adjacent wall, stack or other fixed devices, to aline the truck and body for loading or unloading will now be described.

As illustrated in Figs. 8, 9, and 10, this vehicle body carried by the movable frame, comprises a floor 80 and sides 81 which may be of plank, metal, or other material and construction. A plurality of braces 82, preferably metal, are fitted across the flooring 80, carrying hinge links by which the sides 81 are hinged to the body. Straps 83 extend across in position to register with and coöperate with the bottom braces 82, to be united by the links 85. Each brace 83 is preferably flanged or bent under an edge of the lower portion of the side, as shown at 86, Figs. 8 and 9, and 10, the inner end being pivoted at 87 to one end of a link 85, the other end of said link being pivoted at 89 corresponding and coöperating with the floor braces 82. This construction as best shown in Figs. 8 and 9, permits the sides 81 to be brought closely in contact with the contents of the vehicle body, indicated generally in dotted lines at 90 and to be there held in contact with the sides of the floor 80 during transportation, whereupon the sides 81 may be spaced from the load 90 through the operation of the link construction 85, as clearly shown in the drawings, permitting the load 90 to be removed free of frictional engagement of the sides 81.

In order to hold the sides 81 either closely in contact with the load, as shown in Fig. 8, or spaced therefrom as shown in Fig. 9, I prefer to employ novel means which will accomplish this result. To this end I place a brace 91 transversely of the flooring 80, said brace being formed on a strap iron and with the end portion projecting and turned at right angles into an extension 92 carrying an eye 93 projecting slightly beyond the sides of the flooring, in position to extend through corresponding slots 94 in the side braces 83. Hooks 95 are pivoted at 96 to each of the side braces 83 of appropriate length to extend downwardly and engage the eye 93 in the extension 92 of these straps. As best illustrated in Figs. 1, 6, and 8, this hook and eye construction thus constitutes a combined bracing and locking arrangement for the sides 81, holding the sides firmly in closed position and with the relatively long leverage afforded by the length of the hooks 95 from their pivots 96 to the eye brace 92, at a plurality of points, along each side.

In order to provide means for holding the sides spaced from the load during loading or unloading as shown in Fig. 9, any suitable device may be employed. As herein illustrated, I form a slight recess 97 on the inner surface of the sides opposite to each of the braces 83 and adjacent the lower portion, fitting therein a link or dog 100 attached to a pivot 101, permitting the dog to swing freely and of appropriate length to ride up over the top edge of the eye member 92 of the bottom straps, when the sides 81 are pulled outwardly for the limit of movement permitted by the link 85 after the hooks 95 have been released and the sides moved to position shown in Fig. 9. These dogs will thus, in combination with the bracing effect still secured by the interlocking of the eye portions 92 of each floor strap, with the slots 94 in the side braces 93, hold the sides thus supported. These dogs are thus brought automatically into operative position by simple pulling movements of the sides 81 and a continued movement of the sides outwardly will cause each dog to slide over and off the projecting eye portions 92, thus permitting the sides to be swung outwardly and downwardly, as shown in Fig. 10. Reversal—an inward movement of the sides, simply by forcing them bodily inwardly, slides the dogs 100 out of engagement and permits the sides to move inwardly and downwardly into closed position, shown in Fig. 8. A detailed view is illustrated in Fig. 11.

This feature of having a vehicle body adapted to permit the entire side to be slightly spaced from the load to allow the contents to be unloaded, free of frictional engagement with the sides, is of especial value in facilitating loading as well as unloading and also of particular importance in the handling of articles such as brick, which are easily damaged and broken and it is intended to claim the same broadly.

In the truck shown in the drawings, I have illustrated end braces 71 preferably tapered and formed as a part of a plate 105 attached firmly to the rear of the vehicle frame and forming, lifting, carrying, and holding means for the pallet 70 or for the end of the vehicle. These braces 71 preferably do not extend for the entire width or height and are so spaced and positioned to alternate with supporting foundation sills 110 of the pallet, which forms the end gate of the vehicle. These sills preferably are slightly thicker than the braces 71 and therefore when the vehicle is in vertical position, as shown in Figs. 5 and 6, these sills contact with the ground, taking up the load and permitting the load removal from the vehicle, end braces 71 and vehicle body by the forward movement of the truck.

The apparatus thus described and herein illustrated, particularly when adapted for handling brick or the like in large units, can be easily and accurately operated to pick up a load or to unload it. The brick, for example, being first piled or stacked on the pallet 70 and ready for transportation, rests slightly raised above the ground or support by the foundation sills 110, the truck is backed up to the proximity of the load and substantially in alinement with the sills and thereupon the vehicle body has the forward catch 69 released, power applied either by hand or clutch to actuate the quadrant 25 to raise the vehicle body, moving it upwardly and backwardly on the rollers 15 until the vehicle body has reached a vertical position, as shown in Fig. 5, whereupon it is lowered the requisite distance by the actuation of the quadrant 24. Means are provided for swinging downwardly or spacing the sides 81 and the truck is then backed into position to pick up the loaded pallet 70, the braces 71 engaging the same between the end sills 110,—the spaced sides 81 also constitute guiding devices for this operation. Thereupon the quadrant 24 is actuated to raise the pallet and load and the further movement of the quadrant 25 lowers the now loaded vehicle body onto the chassis. It is of course feasible to load this type of vehicle by simply swinging downwardly one or both sides 81 and with the empty pallet and end gate 70 in position, whereupon the vehicle may be loaded by hand, by a mechanical setter, or by other lifting devices. When thus loaded, the sides are clamped firmly in contact with the load to hold the same firmly in position during transportation, preventing disalinement of a unit stack from jarring, bumping, etc., during the travel of the vehicle. When the point of unloading is reached, the vehicle is backed into position for "spotting" the load and if it is desired to aline a unit stack carried by the vehicle, with another unit, with a wall, or other fixed support, one or both of the sides 81 may be swung outwardly, the endmost edges of the same being means to straighten up the rear of the truck with the other stack, wall or support. It will be seen that this vehicle has the capability of picking up a load or depositing a load,—while the unit stack is actually in contact with adjacent stacks, walls, or the like. This feature is of great importance and eliminates the prior difficulties wherein a considerable space was necessary in which to handle another loading or unloading apparatus of a similar kind. Furthermore the entire unit stack is maintained securely in its formation during the inclination required for picking up a stack vertically and lowering it horizontally by the reverse movement when unloading. Should, for example, a unit of fire brick or face brick be handled, these articles often being packed with straw, excelsior, or the like, to further protect them, to keep the faces from rubbing or marring, the apparatus will hold and maintain such a filling or packing as well as the articles themselves in undisturbed formation. Furthermore the operation of the two quadrants, one acting to elevate the load into vertical position and the other to lower it substantially vertically permits the truck to be employed to pick up or set down a load either on a platform, car, or the ground within a considerable range of height. The entire apparatus thus constitutes the advantages of a combined lifting, loading, transporting, unloading, and setting mechanism,—all of which capabilities are attained in an extremely simple, efficient and quickly acting construction.

It will also be understood that while I have illustrated the invention as applied to an automobile truck capable of carrying a large and heavy load, yet it is feasible to utilize the invention with any vehicle, whether automobile, horse driven, hand truck, or car.

My present invention is further described and defined in the form of claims as follows:

1. Apparatus to load, transport, and unload articles, comprising a vehicle, a body carried thereby and adapted to be moved about a fixed pivot on the vehicle, a pair of quadrants mounted on said pivot adjacent one side of the body, members on the body adapted to be engaged by said quadrants, one of said quadrants coöperating to move the body about on a pivot and the other quadrant constituting means to raise and lower the body substantially vertically.

2. Apparatus to load, transport, and unload articles, comprising a vehicle, a body carried thereby and adapted to be moved about a fixed pivot on the vehicle, a pair of quadrants mounted on said pivot adjacent one side of the body, members on the body adapted to be engaged by said quadrants, one of said quadrants coöperating to move the body about on a pivot and the other quadrant constituting means to raise and lower the body substantially vertically, the first quadrant constituting retaining means to prevent the body from upsetting.

3. Apparatus to load, transport, and unload articles, comprising a vehicle, a body carried thereby and adapted to be moved about a pivot on the vehicle, a plurality of quadrants pivotally secured to said vehicle and engaging pairs of rolls on the body, means to move one set of quadrants to raise the body from horizontal to vertical position or the reverse and means to move another set of quadrants to raise and lower the body while held in substantially vertical position.

4. Apparatus to load, transport, and unload articles, comprising a vehicle, a body carried thereby and adapted to be moved about a pivot on the vehicle, a plurality of quadrants pivotally secured to said vehicle and engaging pairs of rollers on the body, means to move one set of quadrants to raise the body from horizontal to vertical position and to simultaneously move it rearwardly relatively with the said pivot and means to move another set of quadrants to raise and lower the body while in its vertical and rearward position.

5. Apparatus to load, transport, and unload articles, comprising a vehicle, a body carried thereby and adapted to be moved about a pivot on the vehicle, a plurality of quadrants pivotally secured to said vehicle and engaging pairs of rollers on the body, means uniting the first quadrant with the body at the point forward of its center of gravity, means to engage the body on the other set of quadrants at a point rearwardly of its center of gravity, means to actuate said quadrants and move the body rearwardly, whereby its normal center of gravity will be at one side of said pivot and means to raise and lower the body while in said moved position.

6. Apparatus to load, transport, and unload articles, comprising a vehicle, a body carried thereby and adapted to be moved about a pivot on the vehicle, a plurality of quadrants pivotally secured to said vehicle and engaging pairs of rollers on the body, means uniting the first quadrant with the body at the point forward of its center of gravity, means to engage the body on the other set of quadrants at a point rearwardly of its center of gravity, means to actuate said quadrants and move the body rearwardly, whereby its normal center of gravity will be at one side of said pivot and means to raise and lower the body while in said moved position, the said pivot of the vehicle constituting the power applying means while the vehicle is moved forwardly or backwardly while in position between the said points engaged by the quadrants.

7. In a vehicle body of the kind described, means to move the body about a fixed pivot, quadrants mounted on the axis of said pivot, rollers carried by the body on each side and adapted to be engaged by a cam path carried by the quadrants, one of said quadrants having a closed cam track adapted to inclose the roller engaged thereby while permitting said roller to traverse the track, whereby said quadrant holds the body after its center of gravity has moved on either side of the pivot during the forward or backward movement of the vehicle.

In testimony whereof, I have signed my name to this specification, in the presence of two subscribing witnesses.

RAYMOND C. PENFIELD.

Witnesses:
H. J. PACK,
E. G. ALEXANDER.